United States Patent
Chao

[11] 3,864,463
[45] Feb. 4, 1975

[54] PROCESS FOR MANUFACTURE OF ALPHA $FE_2O_3$ PLATELETS
[75] Inventor: Tze Chao, Newark, Del.
[73] Assignee: E. I. du Pont de Nemours and Company, Wilmington, Del.
[22] Filed: Mar. 11, 1974
[21] Appl. No.: 449,723

Related U.S. Application Data
[63] Continuation-in-part of Ser. No. 358,861, May 10, 1973, abandoned.

[52] U.S. Cl.................. 423/633, 423/504, 106/304
[51] Int. Cl....... C01g 49/02, C09c 1/24, C01b 7/02
[58] Field of Search ........... 106/304; 423/633, 502, 423/504

[56] References Cited
UNITED STATES PATENTS
3,376,112 4/1968 Dunn et al...................... 423/633 X
FOREIGN PATENTS OR APPLICATIONS
12,582 5/1970 Japan................................ 423/633

Primary Examiner—Oscar R. Jertiz
Assistant Examiner—Brian E. Hearn

[57] ABSTRACT

Single crystal platelets of $\alpha$-$Fe_2O_3$ are produced by a controlled vapor phase reaction between oxygen and $FeCl_3$ in the presence of an inert bed of particles.

3 Claims, 1 Drawing Figure

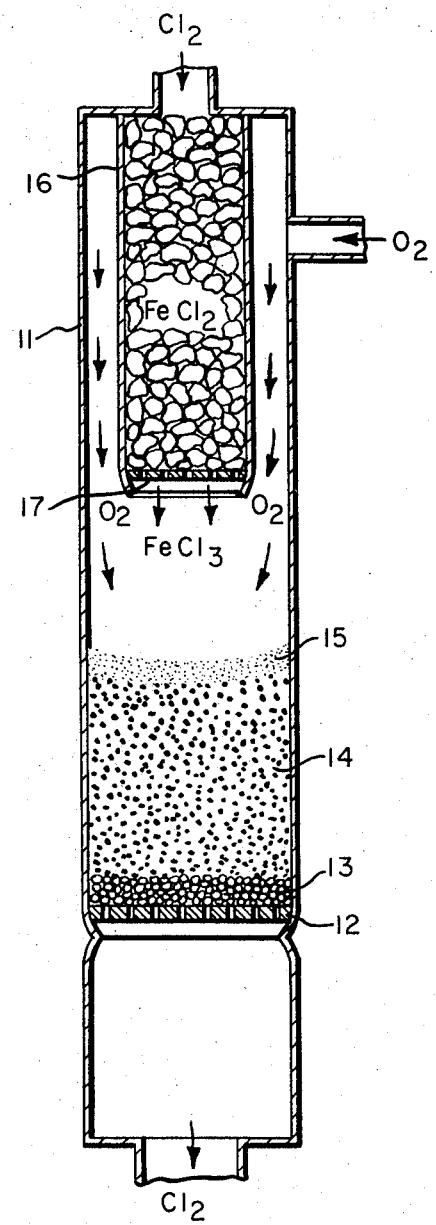

PROCESS FOR MANUFACTURE OF ALPHA FE₂O₃ PLATELETS

CROSS-REFERENCE TO RELATED APPLICATION

This application is a continuation-in-part of copending application Ser. No. 358,861 filed May 10, 1973 now abandoned.

BACKGROUND OF THE INVENTION

U.S. Pat. No. 2,989,411 to Suchow and U.S. Pat. No. 3,471,258 to Brixner describe techniques for the production of nacreous pigments composed of single crystals of alpha iron oxide ($\alpha$-Fe$_2$O$_3$) having a particle size in the range of 2 to 100 microns in diameter and a diameter:thickness ratio of at least 4. The techniques described therein, however, involve not only complex melt procedures but also the reaction periods typically require many hours.

SUMMARY OF THE INVENTION

My invention relates to the manufacture of $\alpha$-Fe$_2$O$_3$ platelets of the type described above but by a process whereby such manufacture can be carried out rapidly and economically in the vapor phase. The process involves reaction of an oxygen-containing gas with FeCl$_3$ in the vapor phase at a temperature of 400°–750°C., the reaction being effected in a static bed of generally spheroidal particles having an average diameter not in an excess of 1 mm, and preferably not in excess of 0.6 mm, there being present in the bed an alkali metal halide in an amount of at least 0.01 percent based upon the weight of particles, and the linear velocity of gas through the bed being at least 0.3 cm/sec. Following completion of the reaction to the desired degree, the product composed of $\alpha$-Fe$_2$O$_3$ in the form of platelets is recovered from the bed of particles, e.g., by dispersing in water or other liquid medium, filtering, washing and drying. In some cases it may be desirable to subject the bed particles in the liquid medium to mechanical treatment, e.g., shaking or other agitation to remove the platelets.

There are various patents and publications which describe the vapor phase reaction at temperatures of 400°–750°C. between oxygen and FeCl$_3$ to produce Fe$_2$O$_3$, often with Cl$_2$ gas being the desired product. In many instances the techniques employed involve the use of fluidized beds of inert particles, e.g., U.S. Pat. No. 2,642,339 to Sawyer. In contrast thereto my invention utilizes a static bed of inert particles, and failure to adhere to this condition, i.e., so that there is significant relative movement between particles during the reaction, will mean that generally spherical (i.e., granular) $\alpha$-Fe$_2$O$_3$ particles rather than the desired platelets, will be produced. A similar result occurs if an inadequate flow of gas is not maintained, i.e., a lineal gas velocity of at least 0.3 cm/sec has been found to be needed if platelets are to be produced and preferably there will be used a linear gas velocity of about 1–10 cm/sec. Where the vessel containing the bed particles is not completely filled, care must be exercised to ensure that fluidization velocity is not achieved.

It is also known to effect the same oxidation reaction in the presence of alkali metal salts such as NaCl, which form a complex with FeCl$_3$. One such procedure is that described in U.S. Pat. No. 3,376,112 to Dunn et al. using a bed of inert particles moving slowly through a reactor to provide a surface upon which the reaction takes place. The patent describes the use, however, of relatively large inert particles of 1/16 to ½ inch diameter which are not effective in producing $\alpha$-Fe$_2$O$_3$ in the form of platelets. For the production of such platelets I have found it is necessary that the particles be generally spheroidal, i.e., in the nature of sand grains, having an average diameter not in excess of about 1 mm, preferably with no more than 30 percent by weight of the particles having a diameter above 1 mm.

Apart from the foregoing, the processing conditions employed in the practice of the present invention are generally the same as those described in the aforementioned Dunn et al. patent, the disclosure of which is incorporated herein by reference. It is to be understood, however, that I am not limited to the use of a moving bed of particles and that in general I prefer the amount of alkali metal halide be relatively small, i.e., 0.01 to 10 percent based on the weight of inert particles. While I prefer sodium chloride, I can also use potassium or lithium chlorides as well as certain alkali metal iodides and bromides.

The invention will be further described in the Examples wherein there is reference to the drawing showing one suitable form of apparatus for carrying out the process. Parts and percentages in the Examples are by weight unless otherwise indicated.

EXAMPLE 1

As shown in FIG. 1, the reactor is formed of a silica tube 11 of approximately 2.5 cm internal diameter. The inert bed material is composed of the following layers upon a perforated silica support 12: a lower 1 cm deep layer (23.5 grams) 13 of 2 mm zirconia beads, an intermediate 4 cm deep layer (40 grams) 14 of Ottawa sand of about 1 mm particle size and an upper 1 cm deep layer (17.4 grams) 15 of zircon spheres of about 0.17 to 0.25 mm particle size. Before being placed in the reactor the particles are stirred together with an aqueous sodium chloride solution, dried to deposit a total 0.1 gram NaCl uniformly thereon and screened.

Centered within the silica tube is a smaller tube 16, the lower end of which terminates at a perforated support 17 about 1 cm above the bed material. The smaller tube contains solid granular FeCl$_2$ and its upper end is connected to a source of chlorine gas. As chlorine gas is metered into contact with the FeCl$_2$, a steady stream of gaseous Fe$_2$Cl$_6$ is generated in the smaller tube and passed into contact with the bed material.

Oxygen gas is introduced into the annular space between the two tubes and this results in an annular shaped stream thereof being produced. The oxygen stream is thus concurrent with the Fe$_2$Cl$_6$ stream, being largely between the latter stream and the inner wall of the silica tube.

The reactor is vertically mounted in an electrically heated furnace so as to raise the temperature of the FeCl$_2$ and the entire bed material to 585°C. Thereupon the introduction of Cl$_2$ and O$_2$ is commenced in amounts to generate 13.2 m moles Fe$_2$Cl$_6$/minute and 20 m moles O$_2$/minute. The velocity of gas through the bed is 8.1 cm/sec. The off-gases are scrubbed with water and discarded.

After 7.5 minutes reaction, the flow of gases is stopped and the bed material is removed and transferred into a bottle filled with water. Part of the Fe$_2$O$_3$ platelets adhered on the inert particles are freed by vigorous shaking for about 5 minutes. However, the majority of the platelets are already in a free state. The entire mixture is then poured into a 140-mesh screen and thus the fine particle size platelets are separated from the bed material. The iron oxide platelets are then washed with water, filtered and dried.

Examination of the platelets under the microscope reveals that essentially all of the particles have a thickness in the range of 0.02 to 0.5 $\mu$, with an average of about 0.1 $\mu$. The length of major dimension of the particles averages about 5 $\mu$. The ratio of length to thickness is thus about 50:1. The specific surface area of the particles is about 1.7 m$^2$/gram.

By X-ray analysis the platelets are found to be $\alpha$-Fe$_2$O$_3$. They are furthermore of a nacreous appearance when dispersed in water, and demonstrate a ferromagnetic effect under the influence of a strong magnetic.

EXAMPLE 2

The general procedure of Example 1 is employed but the amount of NaCl on the inert particles is increased from 0.1 to 1.0 gram and the temperature is maintained at 485°C. The $\alpha$-Fe$_2$O$_3$ platelets so obtained are of essentially the same character as those described in Example 1.

EXAMPLES 3, 4 AND 5

The general procedure of Example 1 is employed in each case but using the following alkali metal halides in place of NaCl.

| Example 3 | 0.1% KCl |
| Example 4 | 0.1% KI |
| Example 5 | 0.1% LiCl | the $\alpha$-Fe$_2$O$_3$ platelets so obtained are of essentially the same character as those described in Example 1.

EXAMPLES 6, 7 AND CONTROLS

The general procedure of Example 1 is employed in each case using inert particles of the type and size shown in the Table and operating with the following reaction conditions:
 Depth of inert particles in bed, 6 to 6.5 cm.
 Amount of NaCl, 0.500 g.
 Gas flow rate of Cl$_2$, 296 ml/min.
 Gas flow rate of O$_2$, 448 ml/min.
 Duration of reaction, 7-10 minutes.

The $\alpha$-Fe$_2$O$_3$ obtained from Examples 6 and 7 is in the form of platelets of essentially the same character as those described in Example 1. The product of Control A consists of a preponderance of dark colored granular $\alpha$-Fe$_2$O$_3$ with a small portion of $\alpha$-Fe$_2$O$_3$ platelets. The products of Controls B and C consists essentially of dark colored granular $\alpha$-Fe$_2$O$_3$ with no detectable platelets.

It is concluded from the above that the maximum tolerable average diameter of inert particles is 1 mm to produce a substantial quantity of $\alpha$-Fe$_2$O$_3$ platelets and that less than 0.6 mm is preferred to achieve optimum quality $\alpha$-Fe$_2$O$_3$.

EXAMPLES 6a, 7a AND CONTROLS

The procedure of Examples 6, 7 and Controls is employed using the materials shown in the Table, but the 0.500 g of NaCl is omitted. The type and quality of products for Examples 6a, 7a and the corresponding Controls is substantially the same as that obtained in Examples 6, 7 and Control A, B and C, respectively, the only difference being that the yield is somewhat less in the absence of NaCl.

TABLE

| | | Particle Size | |
|---|---|---|---|
| Example | Material Identity | mm | Mesh (Standard U.S. Sieve) |
| 6 | Ottawa sand | −0.60 + 0.36 | −30 + 45 |
| 7 | Ottawa sand | −0.48 + 0.60 | −20 + 30 |
| Control A | Ottawa sand | −1.41 + 0.84 | −14 + 20 |
| Control B | Zircon spheres | −1.68 + 1.41 | −12 + 14 |
| Control C | Mullite spheres | −2.83 + 2.38 | −7 + 8 |

What is claimed is:

1. In a process for the manufacture of $\alpha$-Fe$_2$O$_3$ by the reaction of an oxygen-containing gas with FeCl$_3$ in the vapor phase at a temperature of 400°–750°C. in a static bed of inert particles, the improvement for producing $\alpha$-Fe$_2$O$_3$ in platelet form having a particle diameter of from about 2 to 100 microns and a ratio of diameter to thickness of at least 4 wherein the reaction is effected in the presence of inert generally spheroidal particles having an average diameter not in excess of 1 mm, there being present in the bed an alkali metal halide in an amount of 0.01 to 10 percent based upon the weight of particles, and the linear velocity of gas through the bed being from 0.3 cm/sec. to about 10 cm/sec.

2. Process according to claim 1 wherein the average diameter of the inert generally spheroidal particles is not in excess of 0.6 mm.

3. Process according to claim 1 wherein the alkali metal halide is sodium chloride.

* * * * *